United States Patent

[11] 3,558,979

[72] Inventor William M. Lorenz
Saugerties, N.Y.
[21] Appl. No. 678,881
[22] Filed Oct. 30, 1967
[45] Patented Jan. 26, 1971
[73] Assignee International Business Machines Corporation
Armonk, N.Y.
a corporation of New York

[54] OVERVOLTAGE PROTECTION CIRCUIT
9 Claims, 1 Drawing Fig.

[52] U.S. Cl. .......... 317/16, 317/33, 330/26, 330/112
[51] Int. Cl. .......... H02h 3/00
[50] Field of Search .......... 317/16, 33, 33SCR; 330/26, 85, 112; 323/8

[56] References Cited
UNITED STATES PATENTS

| | | | |
|---|---|---|---|
| 3,043,965 | 7/1962 | Scarbrough et al. .......... | 330/26X |
| 3,137,826 | 6/1964 | Boudrins .......... | |
| 3,253,189 | 5/1966 | Wouk .......... | 317/16 |
| 3,304,489 | 2/1967 | Brolin et al. .......... | 317/33X |
| 3,353,066 | 11/1967 | DeSouza .......... | 317/16X |
| 3,359,434 | 12/1967 | Galluzzi .......... | 317/16X |
| 3,262,014 | 7/1966 | Conner .......... | 317/13 |

*Primary Examiner*—William M. Shoop, Jr.
*Attorneys*—Hanifin and Jancin and Nathan Cass

ABSTRACT: An overvoltage protection circuit for a power supply employing a latching feedback control circuit cooperating with a silicon-controlled rectifier to provide protection against overvoltage by switching the silicon controlled rectifier at a much faster than normal speed to short out the power supply in the event an overvoltage condition occurs.

PATENTED JAN 26 1971
3,558,979
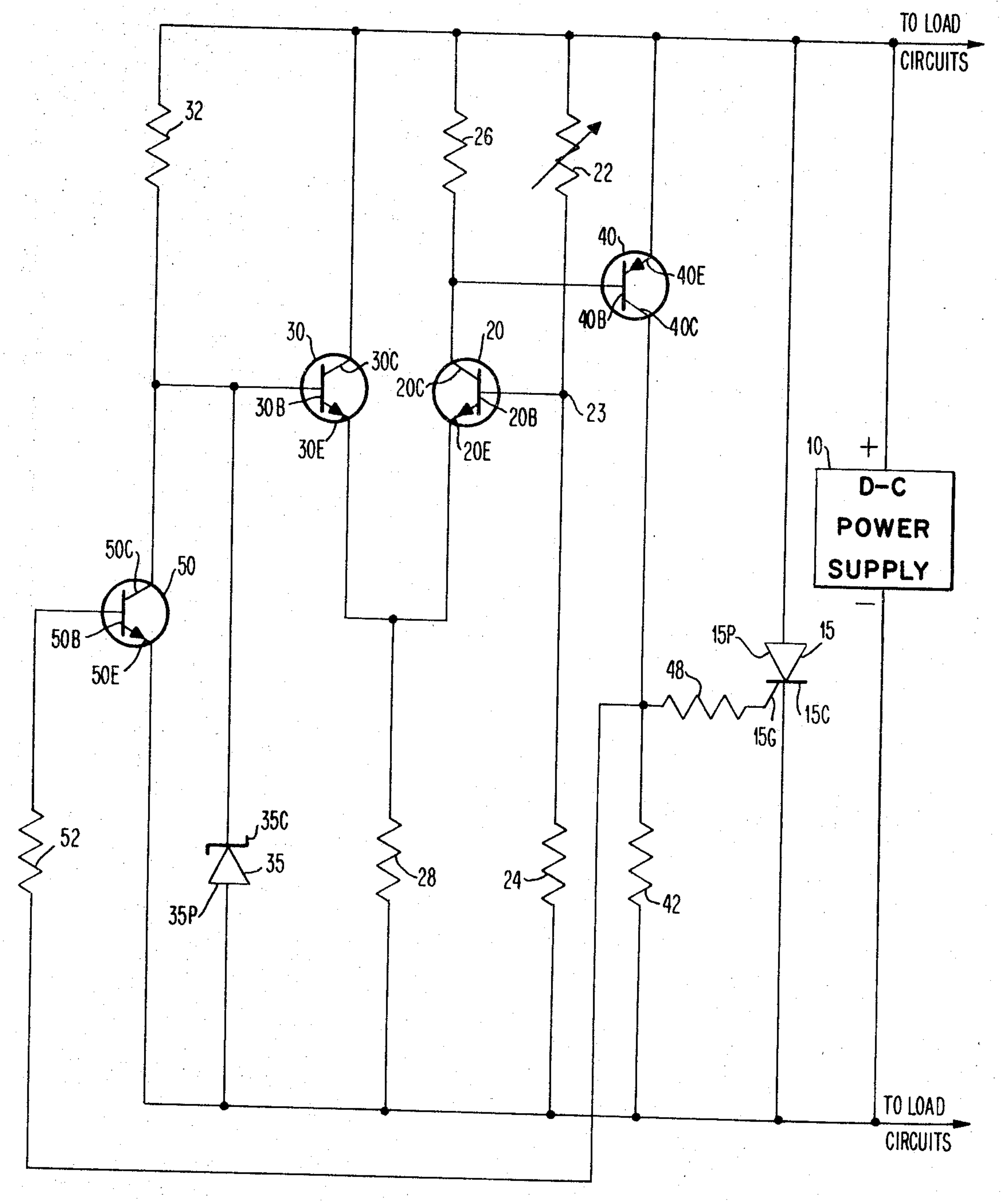
INVENTOR
WILLIAM M. LORENZ
BY Nathan Cass
ATTORNEY

OVERVOLTAGE PROTECTION CIRCUIT

This invention relates generally to circuits for protecting against improperly applied voltages, and more particularly to an improved high-speed overvoltage protection circuit.

Present day circuits and circuit components, particularly those used in integrated and circuits, are highly vulnerable to damage from transients and require immediate and reliable protection in order to prevent damage. Various techniques are known for providing overvoltage protection, such as involving the use of mechanical devices, like circuit breakers and fuses, or the use of electronic switching circuits, where speed is important, or combinations of both. Although the use of electronic techniques to provide overvoltage protection permits a high speed of operation to be obtained, various applications require even greater speeds of operation which have necessitated resort to complex and critical circuits.

In accordance with the present invention, an economical and noncritical overvoltage protection circuit is provided which is capable of very fast and reliable operation, significantly beyond what would be expected for a circuit of this simplicity and noncriticality In a typical embodiment of the invention, a Zener diode is used at one input to a transistor differential amplifier to provide a noncritical reference, and the other input of the differential amplifier is coupled to sense the voltage against which protection is desired. The differential amplifier output is fed to a driver transistor whose output is in turn coupled to the gate element of a silicon-controlled rectifier for turning on the silicon-controlled rectifier in response to an overvoltage condition. A feedback transistor has its input coupled to the driver transistor and its output coupled to the Zener diode in a manner so that the feedback ta transistor not only provides for latching, but also serves to greatly accelerate the switching of the differential amplifier and the driver transistor, whereby the silicon-controlled rectifier is driven to its on state in a very much shorter time than would otherwise be possible.

The foregoing and other objects, features and advantages of the invention will be apparent from the following more particular description of a preferred embodiment of the invention, as illustrated in the accompanying drawing.

The drawing is a schematic electrical circuit diagram of an embodiment of an overvoltage protection circuit in accordance with the invention.

Referring to the drawing, a DC power supply 10 for which overvoltage protection is to be provided in accordance with the invention has a silicon-controlled rectifier 15 connected thereacross with its plate 15P connected to the positive side of power supply 10 and its cathode 15C connected to the negative side. The manner of obtaining overvoltage protection in such an arrangement is by causing the silicon-controlled rectifier to be shorted in response to the detection of an overvoltage condition, whereby the load circuits (not shown) fed by power supply 10 will be protected. Where the load circuits are such as to be capable of being damaged by an overvoltage existing for even a very short period of time, it is of greatest importance that the silicon-controlled rectifier 15 operate as fast as possible in order to eliminate the overvoltage condition before damage can occur. The manner in which the required fast operation of the silicon-controlled rectifier 15 is achieved by the economical, noncritical circuit of the invention shown in the drawing will now be considered in detail.

The overvoltage condition against which protection is desired is sensed by an emitter-coupled transistor differential amplifier comprised of NPN transistors 20 and 30. Differential amplifier transistor 20 has its base 20B connected to the junction 23 between a voltage divider comprised of adjustable resistors 22 and resistor 24 connected in series across power supply 10, its collector 20C connected via a collector resistor 26 to the positive side of power supply 10, and its emitter 20E connected via common emitter resistor 28 to the negative side of power supply 10. Differential amplifier transistor 30 has its collector 30C connected to the positive side of power supply 10, its emitter 30E connected via common emitter resistor 28 to the negative side of power supply 10, and its base 30B connected to the cathode 35C of a Zener diode 35 whose plate 35P is connected to the negative side of power supply 10.

In the normal state of the circuit, when no protection is required, feedback transistor 50 (which will be considered in more detail hereinafter) will be off, causing Zener diode 35 to be conducting in the reversed direction as a result of current flow thereto via resistor 32. The Zener breakdown voltage is used to provide a noncritical reference voltage at the base 30B of transistor 30 for comparison by the differential amplifier with the voltage from the voltage divider junction 23 applied to the base 20B of transistor 20. Adjustable resistor 22 of the voltage divider is adjusted so that, when the voltage of power supply 10 is below that for which protection is required, transistor 20 is off, while transistor 30 is on, the values of the associated collector and emitter resistors 26 and 28 and the breakdown voltage of Zener diode 35 being chosen accordingly.

The output of the transistor differential amplifier comprised of transistors 20 and 30 is applied to a PNP driver 4 transistor 40 by connecting the collector 20C of transistor 20 to the base 40B of transistor 40, the emitter 40E being connected to the positive side of power supply 10, an and the collector 40C being connected via a collector resistor 42 to the negative side of power supply 10. It will be remembered from the previous paragraph that, when the circuit is in its normal condition where the voltage of power u supply 10 is below that for which protection is required, transistor 20 is off, while transistor 30 is on. For this condition, the relatively high voltage appearing on collector 20C of transistor 20, which is applied to base 40B of driver transistor 40, causes driver transistor 40 to likewise be off. The driver transistor collector 40C will thus be at essentially the voltage of the negative side of power supply 10, which when applied via resistor 48 to the silicon-controlled rectifier gate element as 15G, and via resistor 52 to the base 50B of feedback transistor 50, causes both to be in their off condition.

In summary, it will be evident that, for the normal state of the circuit shown in the drawing where no protection is required, the circuit is constructed and arranged so that Zener diode 35 is conducting, differential transistor 30 is on, and differential amplifier transistor 20, driver transistor 40, feedback transistor 50 and silicon-controlled rectifier 15 are all off.

Assuming now that power supply 10 rises to the predetermined voltage for which protection is required, the voltage of voltage divider junction 23 will rise and begin to turn on differential amplifier transistor 20, causing collector 20C to rise and in turn begin to turn on driver transistor 40. Ignoring for the moment the effect of feedback transistor 50 and Zener diode 15, it will be understood that, if power supply 10 remains at this predetermined voltage long enough, differential amplifier transit transistor 20 will be caused to fully turn on, while differential amplifier transistor 30 will be turned off, resulting in driver transistor 40 being turned on to trigger silicon-controlled rectifier 15 to short out power supply 10. However, such a process, if left to itself, would be too slow for various applications involving highly delicate circuits. The manner in which this process is greatly accelerated, in accordance with the present invention, while additionally providing for latching of the circuit in the protected state will now be described.

As shown in the drawing, collector 40C of driver transistor 40 is applied to the gate element 15G of silicon-controlled rectifier 15 for turning it on. Collector 40C is also applied to base 50B of feedback transistor 50 whose collector 50C and emitter 50E are connected across Zener diode 35. As driver transistor 40 begins to turn on in response to differential amplifier transistor 20 sensing an overvoltage condition, feedback transistor 50 also begins to turn on, which in turn reduces the current flowing to Zener diode 35 via collector resistor 32. The voltage across Zener diode 35 will thus fall, a causing the turn off of differential amplifier transister 30 and the turn on of differential amplifier transistor 20 to be accelerated, thereby accelerating the turning on of driver transistor 40, and thus the turning on of feedback transistor 50. The feedback is regenerative in nature so that a very great reduction is obtained in the time required for silicon-controlled rectifier 15 to switch from its off to its on state.

Feedback transistor 50 not only aids in providing much faster switching, as described above, but additionally serves to latch the circuit in its protected state. This latching will occur as a result of feedback transistor 50 turning on to cause the current flowing to Zener diode 35 to be reduced by an amount which will provide reverse bias voltage to the base 30B of differential transistor 30 to maintain it off.

Another advantage of the overvoltage protection circuit in accordance with the invention is that driver transistor 40 may be of relatively low power capability, since the very fast operation of the circuit causes transistor 40 to be in its high power dissipation region for only a very short period of time, thereby preventing burn out of the transistor which would otherwise occur if the more conventional slower speed operation occurred.

The following exemplary values are now presented for the exemplary circuit illustrated in drawing, it being understood that they are provided merely for illustrative purposes, and should not be considered as limiting the present invention in any way, since many modifications and variations in values as well as circuit arrangement are possible without departing from the invention.

| | | |
|---|---|---|
| D-c power supply 10 | volts | 3 |
| Adjustable resistor 32 | ohms maximum | 250 |
| Resistor: | | |
| 24 | ohms | 100 |
| 26 | do | 220 |
| 28 | do | 130 |
| 32 | do | 240 |
| 42 | do | 100 |
| 48 | do | 30 |
| 52 | do | 150 |

While the invention has been particularly shown and described with reference to a preferred embodiment thereof, it will be understood by those skilled in the art that various changes in form and details may b be made therein without departing from the spirit and scope of the invention.

I claim:

1. An overvoltage protection circuit for a power source comprising:
   initiatable means coupled to said source so that initiation thereof is effective to protect against an overvoltage of said source;
   control means including a driver transistor coupled to said initiable means for causing initiation thereof by and upon increased conduction through said driver in response to the sensing of an overvoltage of said source; and
   said control means including means for sensing an overvoltage of said source and regenerative means for increasing conduction regeneratively through said transistor to thereby drive said initiable means to an initiated state rapidly in response to the sensing of an overvoltage.

2. The invention in accordance with claim 1, wherein said initiatable means is a silicon controlled rectifier.

3. An overvoltage protection circuit for a power source comprising:
   a silicon-controlled rectifier coupled to said source so that initiation thereof is effective to protect against an overvoltage of said source;
   and control means coupled to said silicon-controlled rectifier for a causing initiation the thereof in response to the sensing of an overvoltage of said source;
   said control means including means for send sensing an overvoltage of said source and regenerative means for driving said silicon-controlled rectifier to an initiated state in response to the sensing of an overvoltage; and
   said silicon-controlled rectifier being coupled to said source so that initiation thereof acts to short out said source.

4. An overvoltage protection circuit for a power source comprising:
   a silicon-controlled rectifier coupled to said source so that initiation thereof is effective to protect against an overvoltage of said source;
   and control means coupled to said silicon-controlled rectifier for causing initiation thereof in response to the sensing of an overvoltage of said source;
   said control means including means for sensing an overvoltage of said source and regenerative means for driving said silicon-controlled rectifier to an initiated state in response to the sensing of an overvoltage; and
   said control means including means for latching said circuit in a protected state after occurrence of an overvoltage.

5. An overvoltage protection circuit for a power source comprising:
   a silicon-controlled rectifier coupled to said source so that initiation thereof is effective to protect against an overvoltage of said source;
   and control means coupled to said silicon-controlled rectifier for causing initiation thereof in response to the sensing of an overvoltage of said source;
   said control means including means for sensing an overvoltage of said source and regenerative means for driving said silicon-controlled rectifier to an initiated state in response to the sensing of an overvoltage;
   said control means including:
   first transistor means for sensing an overvoltage and for driving said silicon-controlled rectifier . silicon-controlled rectifier towards initiation in response thereto; and
   second transistor means coupled between the input and output of said first transistor means for providing regenerative feedback to accelerate the driving of said silicon-controlled rectifier by said first transistor means.

6. The invention in accordance with claim 5, wherein said first transistor means includes:
   a differential amplifier having first and sec second inputs;
   one of said first and second inputs being coupled to said source; and
   a Zener diode coupled to the other of said first and second inputs so as to provide a reference voltage.

7. An overvoltage protection circuit for a power source comprising:
   a silicon-controlled rectifier coupled to said power source so that initiation thereof acts to short out said source;
   said silicon-controlled rectifier including a gating element;
   first means including a transistor differential amplifier coupled to said source for sensing an overvoltage and for producing an output in response thereto;
   second transistor mans coupled to the output of said transistor differential amplifier for providing an output driving signal to said gating element; and
   third transistor means coupled between the output of said second transistor means and said differential amplifier for providing regenerative feedback to accelerate the generation of said driving signal followed by latching of said circuit in the protected state after occurrence of an overvoltage.

8. The invention in accordance with claim 7,
   wherein said first means includes a Zener diode and means coupled thereto for providing a reference voltage;
   wherein said differential amplifier includes a first input coupled to said source so as to be responsive to voltage changes therein and a second input coupled to said reference voltage so as to permit said differential amplifier to compare the voltage applied to said first input with said reference voltage; and
   wherein said third transistor means includes a feedback transistor having an input coupled to the output of said second transistor means and an output coupled to said Zener diode for changing said reference voltage in a direction which will accelerate the production of said driving signal in response to the sensing of an overvoltage.

9. An overvoltage protection circuit for a power source comprising:

a silicon-controlled rectifier having a plate, a cathode and a gating element;

means coupling the plate and cathode of said silicon-controlled rectifier across said source;

first and second transistors of like polarity type, each having a collector, an emitter and a base;

a common emitter resistor;

means coupling the emitters of said first and second transistors via said common emitter resistor to one side of said power source;

means coupling the collector of said second transistor to the other side of said source;

a first collector resistor;

means coupling the collector of said first transistor via said first collector resistor to said other side of said source;

a Zener diode having a plate and a cathode;

means connecting the cathode of said Zener diode to the base of said second transistor and the plate of said Zener diode to said one side of said power source;

a third transistor of the same polarity type as said first and second transistors, said third transistor having a collector, an emitter and a base;

means coupling the collector of said third transistor to the base of said second transistor and the emitter of said third transistor to said one side of said source;

a second collector resistor;

means coupling the collector of said third transistor via said second collector resistor to said other side of said source;

a fourth transistor of opposite polarity type with respect to said first, second and third transistors, said fourth transistor having a collector, an emitter and a base;

means coupling the base of said fourth transistor to the collector of said first transistor and the emitter of said fourth transistor to said other side of said source;

a third collector resistor;

means coupling the collector of said fourth transistor via said third collector resistor to said one side of said source;

and means coupling the collector of said fourth transistor to said gating element and to the base of said third transistor;

said circuit being constructed and arranged so that when said first and second transistors sense a rise in voltage by said power source to a voltage for which protection is required an initiation signal is provided by said fourth transistor to said gating element of said silicon-controlled rectifier, said driving signal being accelerated by the regenerative feedback action provided by said third transistor following which said circuit becomes latched in a protected state.

PO-1050
(5/69)

UNITED STATES PATENT OFFICE

CERTIFICATE OF CORRECTION

Patent No. 3,558,979 Dated January 26, 1971

Inventor(s) W. M. Lorenz

It is certified that error appears in the above-identified patent and that said Letters Patent are hereby corrected as shown below:

Col. 3, line 53, before "control" add --and--; line 56, change "source; and" to --source,--; line 58, after "and" om: --regenerative--; line 70, after "for" omit --a--; line 70, after "initiation" omit --the--; line 72, after "for" omit --send--; line 75, change "overvoltage; and" to --overvoltag --. Col. 4, line 14, change "overvoltage; and" to --overvol --; lines 32 and 33, omit "silicon controlled rectifier' first occurrence; line 43, after "and" omit --sec--; line 56 "mans" should read --means--.

Signed and sealed this 20th day of July 1971.

(SEAL)
Attest:

EDWARD M.FLETCHER,JR.
Attesting Officer

WILLIAM E. SCHUYLER, JR.
Commissioner of Patents